April 29, 1958   J. J. HILL   2,832,510
VENDING MACHINE
Filed Jan. 20, 1955   7 Sheets-Sheet 2

Fig 2

INVENTOR
James J. Hill
BY
Salvatore G. Militana,
attorney

Fig 3

April 29, 1958 J. J. HILL 2,832,510

VENDING MACHINE

Filed Jan. 20, 1955 7 Sheets-Sheet 4

INVENTOR.
James J Hill
BY Salvatore G. Militana,
attorney

United States Patent Office 2,832,510
Patented Apr. 29, 1958

2,832,510

VENDING MACHINE

James J. Hill, Miami, Fla., assignor to Practical Industries, Inc., Minneapolis, Minn., a corporation of Minnesota Application January 20, 1955, Serial No. 482,960

4 Claims. (Cl. 222—129.4)

This invention relates generally to vending machines and is more particularly directed to those machines that concoct and vend cold and hot drinks from four or more powdered and prepared ingredients with the machine operable from an automatic time cycle of a timing mechanism either manually or electrically operated by the dropping of a coin through a receiving chute or by remote control operation via push button.

The primary object of this invention is to provide a hot drink vending machine which will supply to the customer various types of hot drinks which may be selected and produced by a choice made by the customer, such drinks being vended through a number of electro-mechanical actions that will continue to vend or operate once the equipment has been pre-set to establish that type of drink desired after a starting circuit or mechanism has been coin or manually actuated.

A further object of the present invention is to provide a vending machine with a food containing and dispensing mechanism hinged in such a manner as to facilitate the replenishing of the ingredients and to permit the ready removal of this mechanism in the event of mechanical or electrical failure.

A still further object of the present invention is to provide a hot drink vending machine having the above mentioned characteristics and wherein is included novel, unique, efficient, and inexpensive mechanism for automatically vending the drink of the proper constituency, temperature and taste after the machine has been placed in operation.

Further and more specific objects of the invention are to provide automatic vending machine for drinks such as hot coffee, hot chocolate, hot soup, or any other hot liquid foods capable of being produced by such a device, the said machine being capable of performing successive steps during a given time cycle without further action on the part of the customer other than to first select the drink desired.

The machine embodying this invention is further capable of a continuous automatic operation after being set into motion necessary to complete the following steps:

(1) Delivering a cup to a cup station.

(2) Automatically depositing a measured amount of powdered ingredient into a mixing tube via an ingredient funnel.

(3) Depositing one or more further measured ingredients into the mixing tube via the ingredient funnel the number and type having been pre-selected by the customer.

(4) Supplying a pre-determined quantity of hot water at a constant temperature necessary for dissolving the ingredients in the mixing tube.

(5) Supplying a forced draft of air across the top of the ingredient funnel and beneath the aperture of the ingredient vending tubes.

(6) Opening and closing a steam gate which prevents the steam from the hot water from rising up and into the ingredient containers.

(7) Operating an individual indexing circuit and mechanical cam and switch arrangement to automatically index the dispensing wheels of the ingredients containers at the proper indexing degree.

(8) Operating motor driven stirring rods concentric with each ingredient container rotating each time that a dispensing wheel turns.

(9) Providing interchangeable ingredient wheels which may be chosen by an operator to give a predetermined amount of ingredient.

(10) Superheating the hot water from the boiler, causing recirculation and constant water temperature by an after heater line connected to a hot water solenoid.

(11) Opening a steam gate automatically when ingredients are dropped and closing same when hot water is emitted by a solenoid timed through time switch cams linked to the steam gate.

Other objects of the invention include unique details of construction, all of which contribute to the production of a sanitary, compact, and commercially practicable vending machine. These objects are also to provide electrical mechanism that combines with the electrical mechanism of the equipment all of which is explained in detail in the following descriptive specifications referred to in the accompanying drawings wherein:

Figure 1:
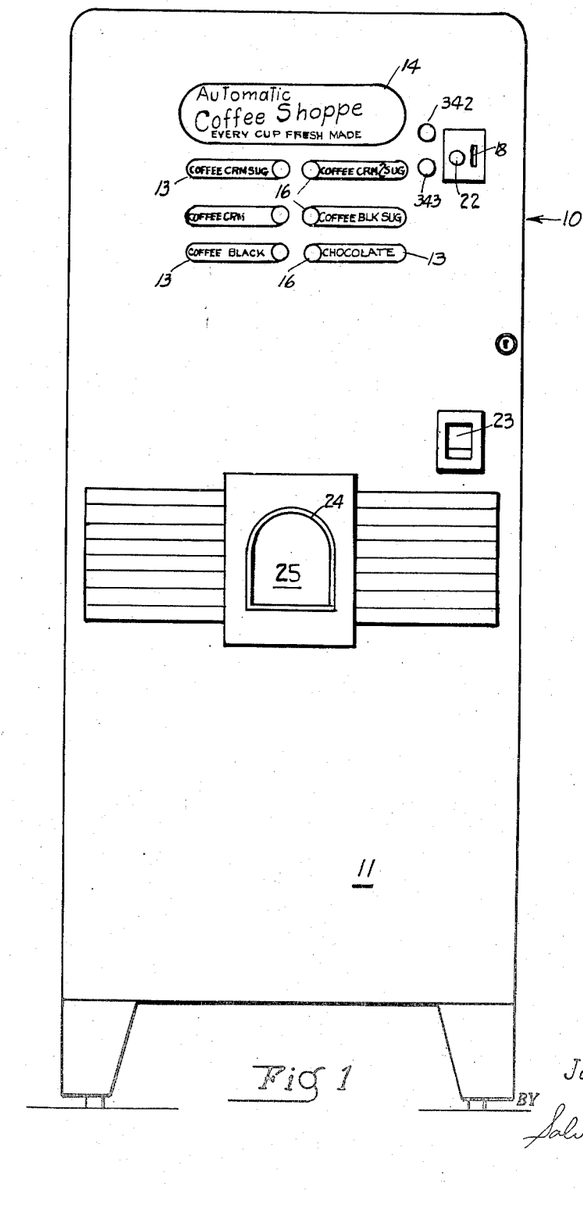
Figure 1 is a front elevational view of a hot drink vending machine embodying the present invention.
Figure 2:
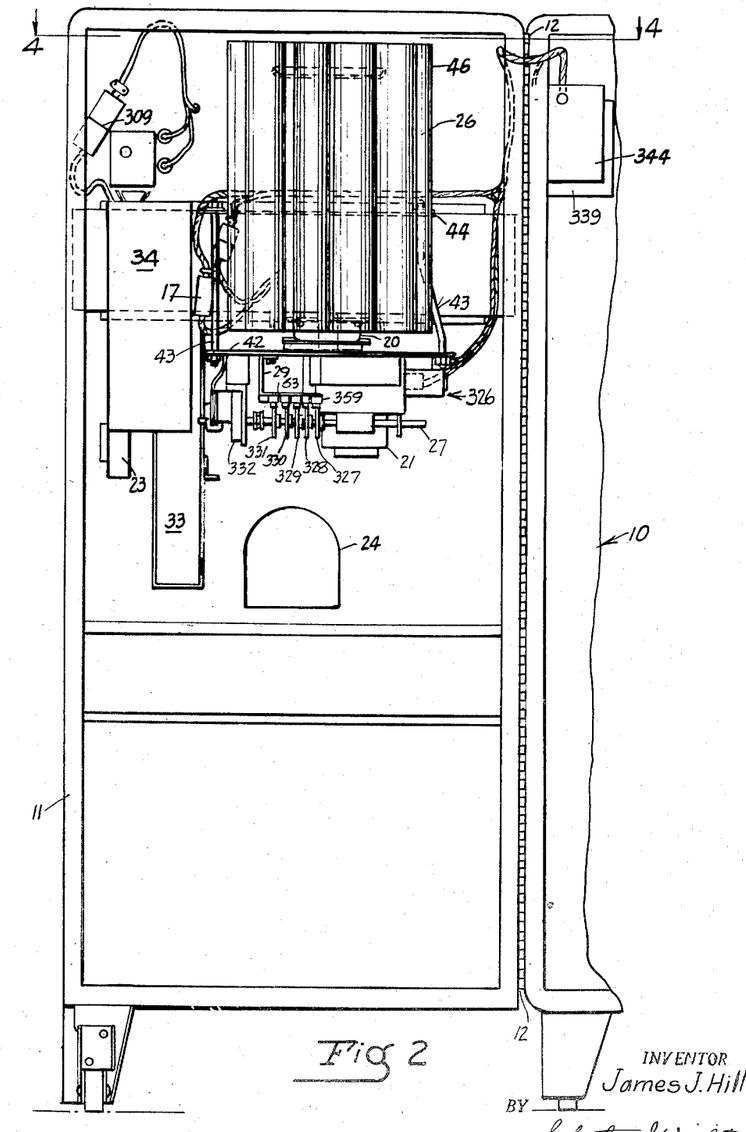
Figure 2 is an elevational view of the interior of the door showing the cup turret, cup station opening, and coin changer mechanism.
Figure 3:
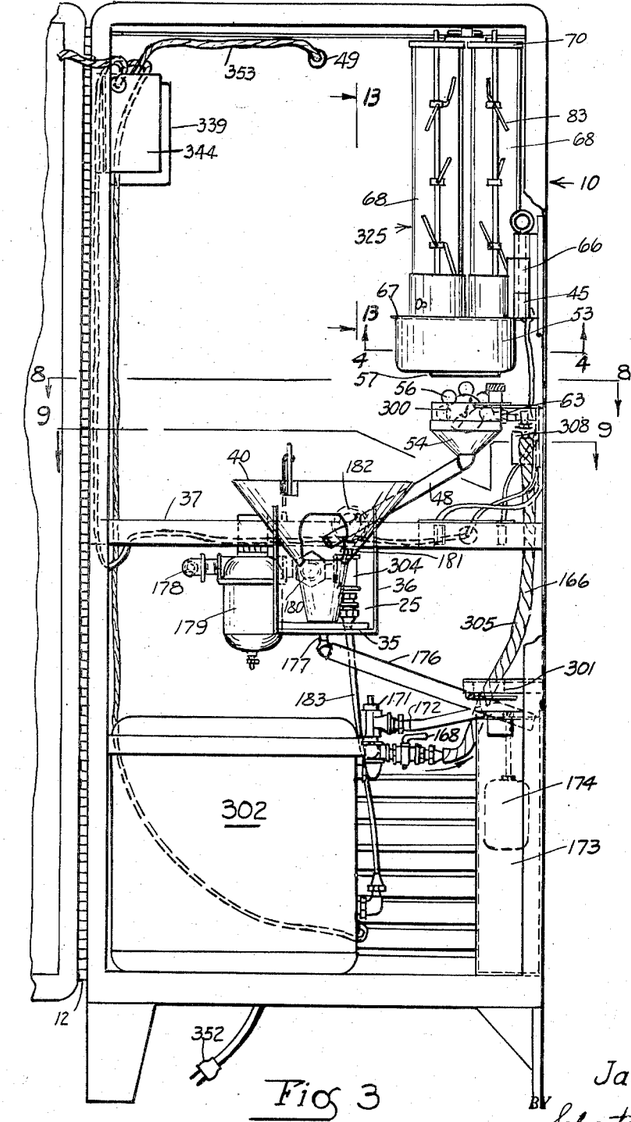
Figure 3 is a similar view of the interior of the cabinet with the door in its open position.

Referring to the drawings wherein similar numerals are used to designate like parts throughout the several views, the numeral 10 refers to a rectangular cabinet opened at one side with a door panel 11 hinged as at 12 thereto for access to the inner portion of the cabinet 10. At the upper portion of the door are a plurality of openings 13, 14 closed off by a panel of translucent material behind which are mounted lamps as are described in greater detail hereinafter for illuminating written matter contained thereon. The panel closing the opening 14 has inscribed thereon the name of the machine and may include any other information deemed pertinent, while the panels of openings 13 indicate the beverages that the machine is capable of concocting and dispensing such as black coffee, coffee and cream, coffee with cream and sugar, coffee with cream and double sugar, black coffee with sugar and chocolate. It is understood, however, that other drinks or beverages may be concocted and dispensed by the machine as desired and likewise the number of different drinks made available by the machine may be varied. Adjacent each of the panels 13 there is a selector button 16 connected to a selector switch as is described in detail hereinafter. Also mounted on the upper portion of the door 11 is a coin slot 18 which is connected on its inner portion to a conventional coin changer mechanism 34 mounted on the inner wall of the door panel 11 and whose lower portion is connected to a coin discharge chute 23 for the discharge of change and by-passed coins to the person using the vending machine. The accepted coins received by the coin changer mechanism 34 drop into a coin receptacle 33 mounted therebelow. Adjacent the coin slot 18 is a coin rejector push button 22 which operates in a well known and conventional manner for the rejection of coins when that function is desired. Also at the upper portion of the door panel 11 there are a pair of jewels behind which lamps 342 and 343 are mounted. When the lamps 342 and 343 are lighted the jewels reveal the inscriptions "sold out" and "use nickels only" respectively.

When the door 11 is in its closed position an opening 24 on the door panel 11 communicates with a dispensing chamber or cup station 25 contained within the cabinet 10. The cup station 25 consisst of a platform 35 secured to side walls 36 which are suspended from a horizontally disposed cross brace 37 that has its end portions secured to the side walls of the cabinet 10 at the forward edge thereof. The cup station 25 is opened at its top portion and has mounted thereon an oval shaped funnel member 40 for receiving a paper cup discharged by a conventional cup dispensing magazine 26.

The cup magazine 26 is provided with a platform 42 supported on the inner wall of the door panel 11 by the usual manner and including a pair of support rods 43 extending from the platform to a flange 44 on the door panel 11. Rotatably secured to the platform 42 is a support 20 upon which a nest of cylindrical cup containers 46 are clustered together for rotational movement thereon. As is explained in detail hereinafter, a paper cup is discharged from one of the containers 46 through a discharge duct 21 at each operation of the vending mechanism. When a cup container 46 becomes empty, the cluster of containers 46 is made to rotate on the support 20 to replace the empty cup container by a filled cup container 46 which will then discharge a paper cup through the discharge duct 21.

On the lower surface of the platform 42 there is mounted a cup turret switch assembly comprising a motor 332 provided with an extended shaft 27 on which are mounted a plurality of cams 327, 328, 329, 330 and 331. These cams are in contact engagement with switches 359, 360, 361, 362 and 363, respectively mounted on a bracket 29. The cup discharge duct 21 directs the discharge of paper cups to the left side (see Figure 3) of a funnel member 40 so as to avoid the free end of a mixing tube 48 which extends to substantially the center of the funnel 40 from the right side thereof.

Referring to Figures 3–7 inclusive particularly an ingredient dispensing assembly 325 is shown provided with a platform 67 and hinge 45 pintled as at 66 to the inner side wall of the cabinet 10 in order to permit the assembly 325 to be pivoted outwardly of the cabinet 10 for ingredient replenishing purposes. The pintle 66 may be withdrawn, if it is desired to remove the entire dispensing assembly 325 from the cabinet 10. Arranged symmetrically on a platform 67 are a plurality of ingredient containers 68 each of which contains and dispenses various ingredients such as coffee, sugar, powdered cream and chocolate or any other ingredient desired for concocting beverages. The containers 68 are cylindrical in shape and are made of transparent material such as glass, plastic and the like to permit the viewing of the contents contained therein.

Figures 4, 5, 6, 7:
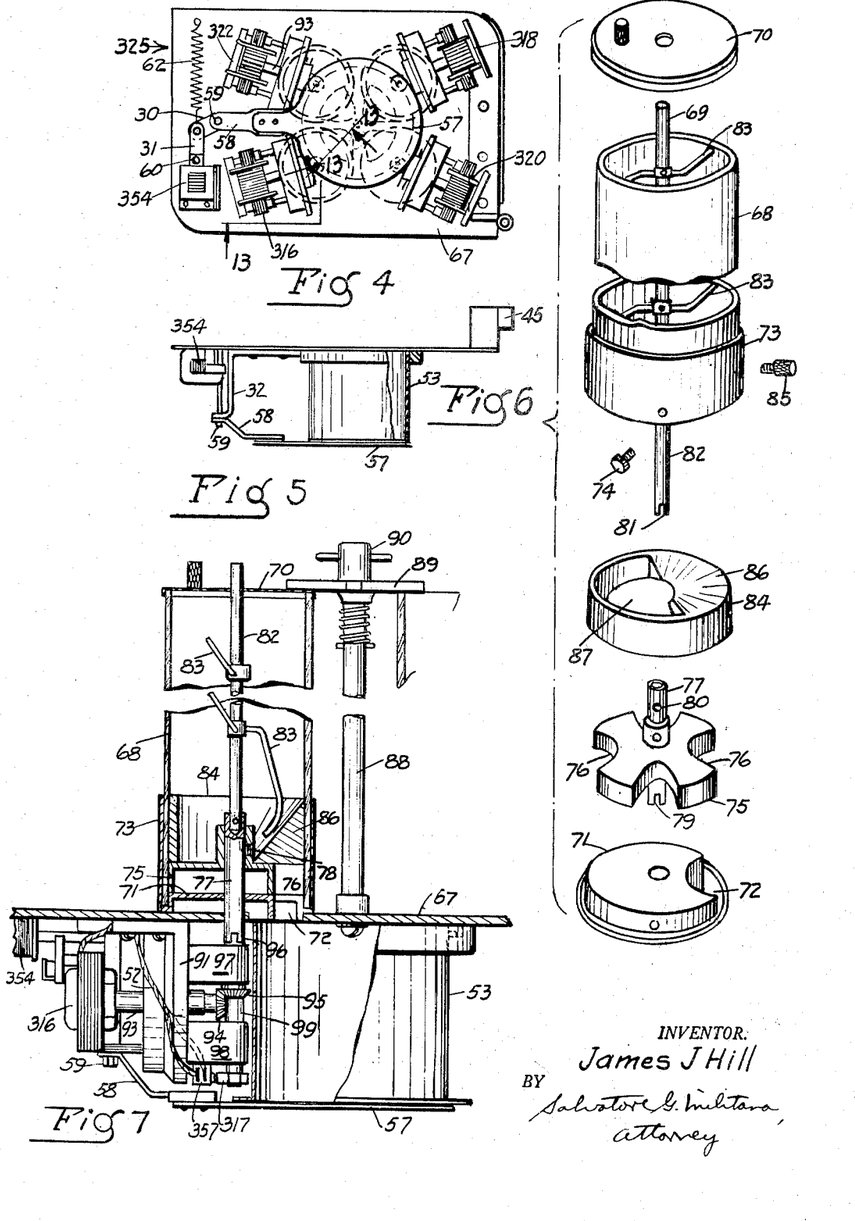
Figure 4 is a bottom view of the ingredient dispensing mechanism taken along the line 4—4 of Figure 3.
Figure 5 is a detached side elevational view of the ingredient dispensing mechanism.
Figure 6 is an exploded detailed view of the ingredient dispensing container showing the cover, the stirring rod, the container wall, ingredient separation partition, the dispensing wheel, and the container base.
Figure 7 is a detailed elevational view of an ingredient container and an associated dispenser partially broken away to show the dispensing mechanism.

Inasmuch as each of the containers 68 are provided with substantially identical containing and dispensing mechanisms, an explanation of a mechanism of one container 68 will suffice to understand the mechanisms of the other containers 68.

The container 68 is provided with a removable cover 70 mounted at the top portion and a base member 71 provided with a discharge spout 72 at the bottom portion of the container 68. A sleeve 73 positioned about the lower portion of the container 68 has a locking bolt 74 extending therethrough into the base member 71 to prevent the rotational movement of the base member 71. Mounted above the base member 71 for rotational movement within the container 68 is a measuring and dispensing disc 75 provided with a plurality of arcuate recesses 76 all equal in size with that of the discharge duct 72 and also symmetrically arranged about the disc 75. Both the base member 71 and the disc 75 are provided with bores through which a stub shaft 77 extends. The shaft 77 is secured by a set screw 78 to the disc 75 for rotational movement therewith and is rotatably mounted in the bore of the base member 71. The lower end of the shaft 77 is slotted as at 79 while the upper end thereof is provided with an axially disposed bore with a pin 80 extending transversely therethrough to engage a slot 81 formed at the lower end of an agitator shaft 82 which extends upwardly through a bore in the cover 70. A plurality of agitator arms 83 have one end secured to the agitator shaft 82 and their other end extending outwardly to a position adjacent to the side wall of the container 68. A baffle disk 84 secured within the container 68 by a locking bolt 85 is mounted above the measuring disc 75 and is provided with a baffle portion 86 positioned above the discharge duct 72 with a semicircular opening 87 extending about the remainder of the disk 84. The containers 68 are removably secured on the platform 67 by a centrally positioned post 88 whose upper end is threaded to receive a clamping plate 89 which engages the covers 70 of the containers 68 and a thumb nut 90 when threaded on the post 88 secures the plate 89.

On the lower wall of the platform 67 there is suspended a bracket 91 on which is mounted a dispensing motor (coffee) 316 on whose shaft 93 there is a bevel gear 94 in mesh engagement with a bevel gear 95. A shaft 96 rotatably mounted on an arm 97 secured to the bracket 91 has the bevel gear 95 mounted at its lower end while its upper portion engages the slot 79 of the shaft 77. A second support arm 98 secured to the bracket 91 is provided with a bore to receive a shaft 99 secured at one end to the gear 95. On the other end of the shaft 99 there is mounted an indexing cam 317 for operating a motor indexing switch 357 connected to the dispensing motor 316 by a lead 52. When the motor 316 is energized the shaft 93 is rotated causing the bevel gears 94, 95 and the shafts 99 and 77 to rotate. The measuring disc 75 will rotate carrying one of the recesses 76 which had become filled with an ingredient contained in the container 68 to become positioned above the discharge spout 72 and below the baffle 86 so that only the measured amount of ingredient contained in the recess 76 will be discharged through the discharge spout 72 and through an enlarged discharge duct 53 which communicates with each of the discharge spouts 72 of the other containers 68. When the disc 75 arrives at the aforementioned position, the cam 317 actuates the indexing switch 357 to deenergize the motor 316. Since there are four recesses 76 in each of the disks 75, the cam 317 will actuate the switch 357 upon a quarter revolution of the motor shaft 93 in order that not more than one measured quantity of an ingredient will be discharged by the ingredient containers 68 concerned. If a double quantity is required, then the indexing cam 317 will rotate through 180 degrees before actuating the indexing switch 357 to deenergize the motor 316. The size of the recesses 76 determine the quantity of ingredient that will be delivered upon each actuation of the disk 75. The discharged ingredients falling through the discharge duct 53 fall directly into an ingredient funnel 54 mounted in spaced relation to the discharge duct 53 and whose discharge or lower end is connected to the mixing tube 48.

A suction fan 300 is mounted in the cabinet 10 in a horizontal plane extending between the discharge duct 53 and the ingredient funnel 54 so as to create a stream of air therebetween. A plurality of vent bores 56 in the rear wall of the cabinet 10 permits the air flow and any steam or other moisture collected in that vicinity to be discharged therethrough. As is explained in detail hereinafter, the fan 300 is constantly energized to maintain the stream of air at all times.

A steam gate 57 which normally obstructs the discharge or lower end of the discharge duct 53 has an actuating arm 58 secured thereto, the free end of the arm 58 being secured to a pivot pin 59 pivotally mounted on a bracket 32. A second lever 30 has one end secured to the pivot pin 59 and its other end pivotally connected to a link 31 pivoted at its other end to the free end of an armature 60 of a solenoid 354. Upon energizing the solenoid 354, the armature 60 and the link 31 slide in the direction of the solenoid 354 causing the lever arm 30 to swing and cause the pivot pin 59 and lever arm 58 to pivot and the steam gate to swing completely out of alignment with the discharge duct 53 to permit the ingredients to be discharged from the containers 68 and to fall directly into the ingredient funnel 54. A spring 62 having one end secured to the platform 67 and the other end secured to the arm 31 compels the steam gate 57 to swing back to its original position upon the deenergization of the solenoid 354. The steam gate 57 prevents the ingress of any steam into the containers 68.

Figure 8:
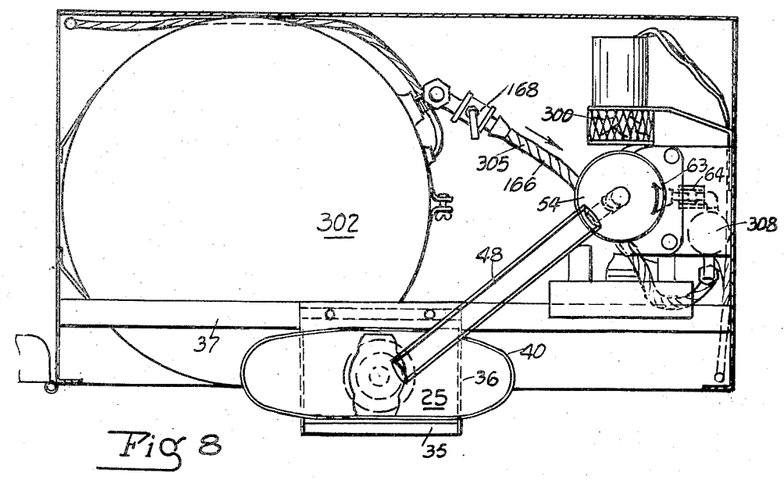
Figure 8 is a detailed sectional view of the lower section of the cabinet interior taken along the line 8—8 of Figure 3.
Figure 9:
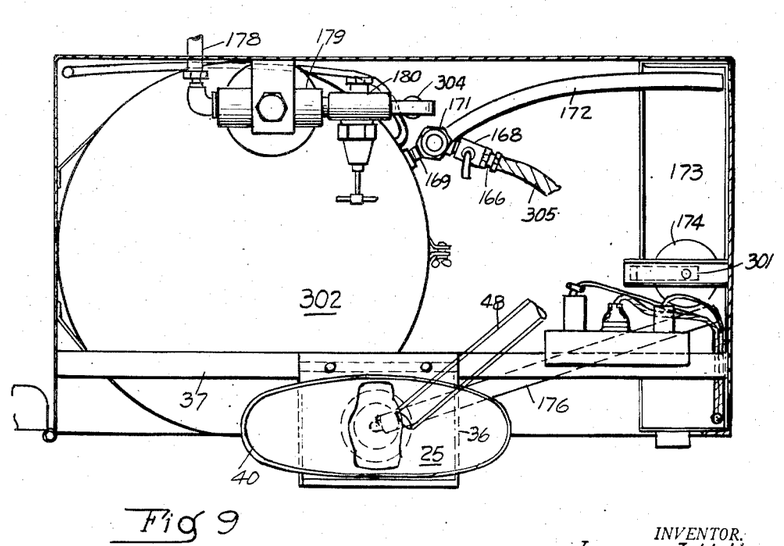
Figure 9 is a detailed sectional view of the lower section of the cabinet interior taken along the line 9—9 of Figure 3.

In the ingredient funnel 54 there is mounted a hot water discharge nozzle 63 which discharges hot water along the inside wall of the funnel 54 giving the water a swirling or whirlpool flow thereabout to dissolve the powdered ingredients previously deposited therein. The hot water nozzle 63 is connected to a flexible coupling 64 which is connected to a solenoid operated valve 308. A water line 166 upon which a conventional wrap on heater element 305 is wound and has one end connected to the valve 308 and the other end to a pet cock 168 connected to a discharge outlet 169 of a hot water boiler 302. The discharge outlet 169 is also connected to an inlet of a pressure operated safety valve 171 whose outlet is connected to a drain line 172. A drain tank 173 which receives the water discharged through the drain line 172 is provided with a float 174 for operating a switch 301 which is adapted to shut off electric power to the device when the drain tank 173 becomes filled. Means is provided to drain any liquids that may be spilled in the cup station 35 comprising a drain line 176 whose end portions are connected to an outlet 177 and the drain tank 173. The function of the pet cock 168 is to make available hot water to a person desiring to draw off same for cleaning or washing purposes.

To the rear wall of the cabinet 10 there is mounted a water inlet 178 to which a water filter 179 is connected. A water pressure regulator 180 connects the filter 179 and a fitting 181 on which a pressure gage 182 is mounted. A water inlet line 183 connects the fitting 181 and the hot water boiler 302. The inlet 178 is connected to a source of water not shown which pipe directs the flow of water through the water filter 179 where any foreign matter in the water is removed. The water then flows through the pressure regulator which places the water entering the system under a predetermined uniform pressure. The water flows past the cold water, solenoid-operated valve 304 into water line 183 and into the boiler 302 where the water is preheated. The water leaves the boiler through outlet 169 and into the line 166 where as it travels along the line the water is heated further by the wrap on heater 305. The water flows past the hot water, solenoid-operated valve 308 and is discharged by the nozzle 63 into the ingredient funnel 54. Normally, the powdered ingredients in measured quantities that constitute the selected beverage are delivered to the ingredient funnel 54, then a predetermined quantity of water heated to a certain temperature is sprayed by the nozzle 63 into the ingredient funnel 54 causing the powdered ingredients and the water to flow through the mixing tube 48 where they become dissolved in the water and discharged into a paper cup previously deposited in the cup station 25. An electric wire 353 which is connected to the electrical mechanism as described in greater detail hereinafter extends from a switch box 339 through a bore 49 in the cabinet rear wall and terminates in a plug 352 adapted to be connected to a source of electricity (not shown).

Figure 10:
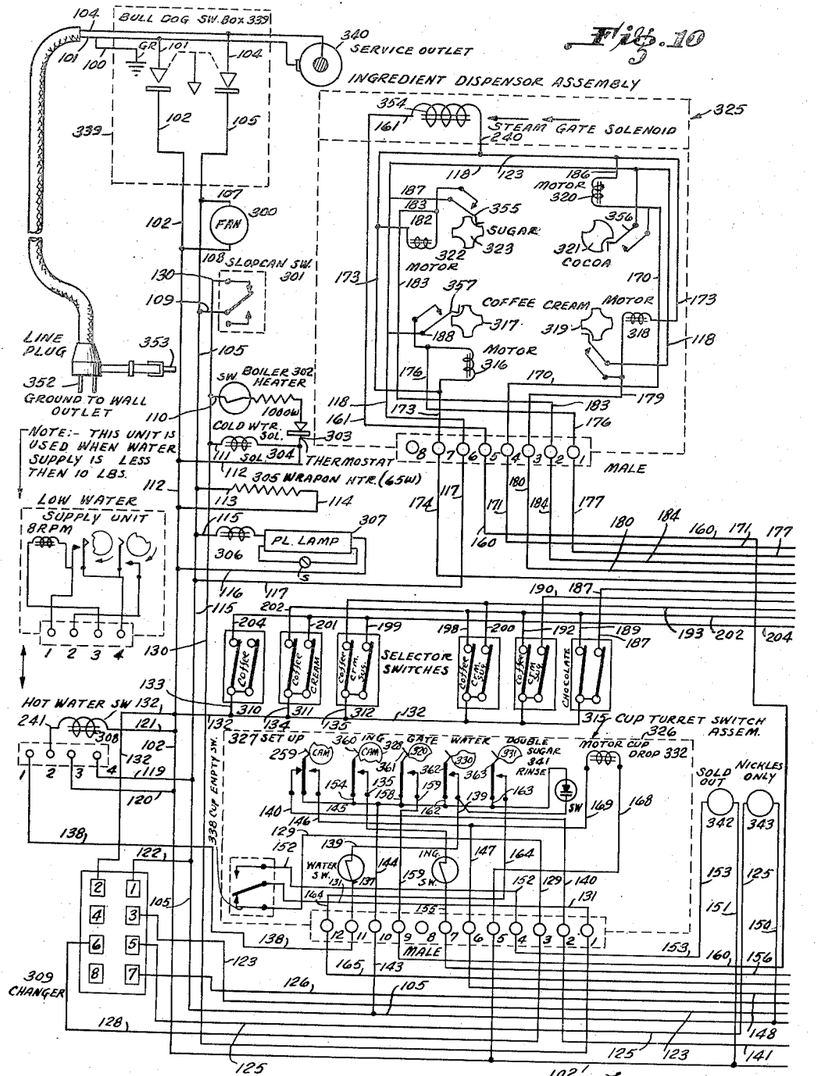
Figures 10 and 11 are detailed electrical schematic drawings showing the full wiring of one particular circuit of the pre-selection type for this vending machine.
Figure 11:
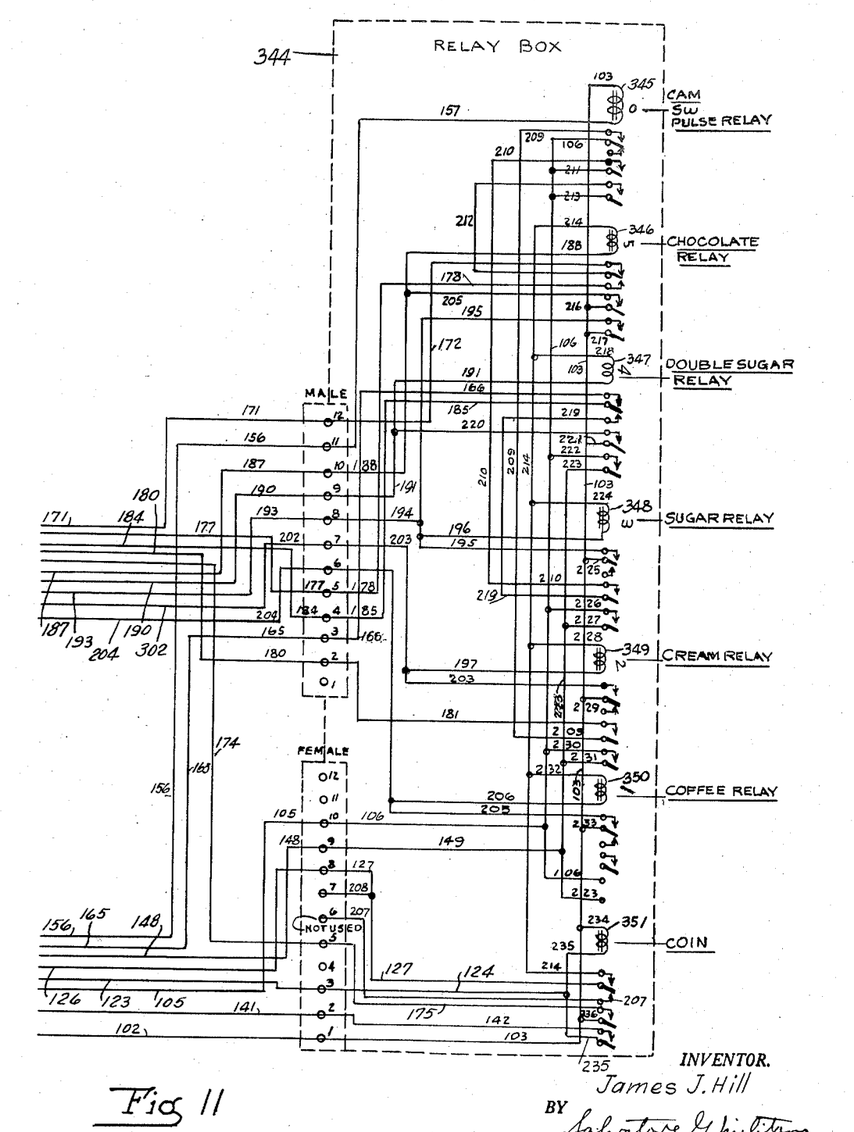

Reference is now made to Figures 10 and 11 which are the electrical and mechanical schematic diagram of the present invention. The coin changer plug 309 utilizes a standard 8 pin Jones socket which is wired to the circuit of a nationally known coin changer 34 with an 8 pin plug. Line 132 connected to pin 2 of plug 352 and line 122 connected to pin 1 of plug 309 are the power leads for the coin changer 34. Lead 3 in the standard changer is connected through normally opened contacts of the micro switch to pin 1. When a coin falling through the changer 34 energizes this switch connecting pin 1 to pin 3 of the Jones socket and plug line 123 is connected to line 122 energizing the coin relay 351 of the relay box the circuit of which may be described as follows: connecting pin 1 to pin 3 by means of the coin changer switch as described above connects lead 122 to lead 105 through thermo switch of the bulldog relay box 339 to line 104 to line plug 352 through the switch contacts of the coin changer through pin 3 of the Jones plug socket to line 123 through pin 3 of the female socket of the relay box to line 124 to line 234 or one side of the coin relay through the coil 351 of the coin relay to line 234 to line 103 through pin 1 of the female Jones socket to line 102 through the thermo switch of the bulldog relay box 339 to line 101 to line plug 352. This energizes the coil of relay 351 closing the normally opened contacts connecting line 235 to line 142. When line 235 is connected to line 142 the coil of the relay which is connected by line 235 through pin 3 of the Jones plug remains connected through the normally opened contacts to line 142 through pin 2 of the female plug of the Jones socket to line 141 to pin 2 of the 12 pin male Jones plug of the cup turret switch assembly 326 through line 140 through the normally closed contacts of line 140 through set up cam switch 359 to line 145 to line 144 through pin 10 of the 12 pin male Jones plug to line 143 to line 105 through the thermo switch of the bulldog relay box to line 104 back to the line plug 352. This keeps relay 351 energized until normally closed contacts of switch 359 connecting lead 140 to lead 145 are opened. The following circuit has energized coin relay 351 via the coin switch in the coin changer connected to the 8 pin Jones plug 309 as described above. Closing this relay sets up the circuit in the relay box whereby the pressing of any of the selector switches 310 to 315 will energize specific relays connected to them in the relay box setting up the circuit starting the timer cup drop motor 332 energizing the proper dispensing motor energizing the steam gate the water solenoid causing the cycle and resetting the coin relay 351 for the acceptance of another coin. This is accomplished in the following manner: With coin relay 351 energized by coin as described above line 214 is connected to line 127. This prepares relays 345, 346, 347, 348, 349 and 350 for operation by means of switches 310, 311, 312, 313, 314 and 315. Line 214 is connected to line 232 of relay coil 350 to line 228 of relay coil 349 to line 224 of relay coil 348 to line 216 of relay coil 347 to line 214 of relay coil 346. Line 214 is connected to line 127 through the closed contacts of the energized relay 351 to pin 8 of female Jones socket to line 126 to pin 7 of the coin changer socket pin 7 of the plug of the coin changer mechanism connects to normally closed set of contacts in the coin switch which connects line 126 to lead 122 to lead 105 through the contacts of the circuit breaker of the bulldog box 329 to lead 104 to the lead plug 352. This lead supplies power to one side of all the coils of the relay box through the closed contacts of the energized coin relay 351. Pressing selector switch 310 connects lead 133 to lead 204 lead 133 is connected to lead 102 through the contacts of the circuit breaker to lead 101 to one side of the A. C. line plug 352. Closing switch 310 connects lead 133 to lead 204 to pin 6 of the male socket of the Jones plug of the relay box 344 to lead 204 to lead 206 and 205 to coil 350 through the coil of 350 to lead 214 which is connected to lead 127 to lead 102 to one side of the line 101. This energizes the coil of line 350. Energizing this coil connects lead 233 to lead 205. Lead 233 is connected to lead 103 through pin 1 of the female socket of the Jones plug to lead 102 through the bulldog box 339 to lead 101 to one side of the line of plug 352. Closing these contacts keeps the coil of relay 350 energized until the timer motor has cycled opening lead 232 and 214. Energizing the coil of relay 350 connects lead 223 to lead 106. Lead 106 as explained before is connected to lead 105 through the bulldog box 339 to lead 104 back to one side of the line of plug 352. Connecting lead 223 to lead 106 connects 223 and 106 to 149 through the 9 pin female socket of the relay box to lead 148 to pin 6 of the male socket of the Jones plug of the cup turret switch assembly 326 through pin 6 to lead 147 to cam switch lead 146 to lead 169 to cup drop motor 332 through the coil of 332 to lead 168 through pin 5 of the 12 pin male Jones plug to lead 167 to lead 102 through the contacts of the circuit breaker to lead 101 to the opposite side of the line of plug 352. Connecting lead 223 to lead 106 of relay 350 applies power to the cup drop motor 332 energizing the motor 332 turning the shaft containing cams 327, 328, 329, 330 and 331 turning these cams actuates the arms of switches 359, 360, 361, 362 and 363. This circuit shows how pressing switch 310 closes relay 350 connects lead 233 to lead 205 and lead 106 to lead 123 energizing the vending motor.

As shown above, connecting lead 106 to 223 applies power to the vending timing motor in the cup turret mechanism 326. Similarly, pressing any one of the switches 310 to 315 must energize the cup drop timing motor 332. Since the contacts of leads 106 and 223 of the coffee relay 350 are parallel and connected to leads 230 and 231 of relay 349 leads 226 and 227 of relay 348, leads 223 and 222 of relay 347, the energizing of any one of these relays will contact the paralleled circuit applying power and operating the cup drop timing motor 332. To continue a completed vending cycle resulting from the closing of the switch contacts on selector switch 310 the following circuits are also connected vending coffee ingredients, hot water, and a cup to the cup station. When power is applied to the coil of the cup drop motor 332 the shaft of which is mechanically connected to set up cam 327, ingredient cam 328, gate cam 329, water cam 330, and double sugar cam 331, the switch arms 360, 361, 362, and 363 are moved inward on the cam closing the cam switches in the following sequence and operating the following electrical equipment. Set up cam switch 359 is a single pole double throw cam switch containing one set of normally closed contacts connected to lead 140. The rotor arm itself connected to lead 145 and the normally opened switch contact connected to lead 146. The switches as shown are in the normal position after a complete cycle of vending has taken place.

The switch contact of lead 140 is normally closed to switch arm 359 which connects lead 140 to lead 145. Since lead 145 is connected through lead 144 through pin 10 of the male Jones plug to lead 143 to lead 105 through the circuit breaker to lead 104 to plug 352, lead 140 is thus connected to one side of the power line 104. Similarly lead 140 through the closed contact of switch 359 is connected to one side of the power line then through pin 2 of the male Jones plug of the cup turret switch assembly to lead 141 to pin 2 of the female Jones socket of the relay box assembly to the normally opened side of the contact of relay 351, the vend relay. This means that when relay 351 closes lead 235 is connected to lead 142 since lead 235 is connected to one side of the coil of the coin relay 351 the holding circuit for coil 351 is in a position for the coin relay to be energized as previously mentioned by the closing of the coin switch of the changer connecting pin 1 of the coin changer plug to pin 3 of the coin changer plug and socket. Similarly after the set up cam 359 has rotated 180° the switch arm of the cam 359 drops into the cut out section of the set up cam 327 opening the contact of lead 140 disconnecting lead 140 from 145 removing power from the holding contacts of leads 142 and 235 of coin relay 351 deenergizing the coil 351, opening the contacts and resetting any relay which had been previously energized by a selector switch. This will be fully explained later. The normally opened contacts of set up switch 359 when in a closed position apply power to the cup drop motor 332 keeping it energized until the switch arm 359 disconnects or breaks from the contact of lead 146 and rests in the position shown the drawing. This is accomplished in the following manner. Lead 145 of switch rotor arm of the set up cam switch 359 is connected through lead 144 through pin 10 of the male Jones plug of the cup turret switch assembly 326 to lead 143 to lead 105 to lead 104 to the line plug 352. This becomes one side of the power line. When the cup drop motor 332 has been energized by the closed circuit of the relay contacts of relay 350, 349, 348 or 347 as explained before, the set up cam rotates in the clockwise direction and switch arm 359 drops into the cutaway section of the set up cam 327, disconnecting lead 145 from lead 140 and connecting lead 145 to lead 146 as explained before. Disconnecting lead 140 from 145 opens the holding circuit of the coin relay 351 the circuit of which also opens the holding lead of all relays 350, 349, 348, 347 and 346 as will be explained later. However, connecting lead 145 to 146 substitutes power line 146 to line 169 of cup drop motor coil 332 for lead 147 applying power to the cup drop motor 332 until the cam has continued to rotate forcing switch arm 359 out of the cutaway section to the outer periphery of the set up cam disconnecting lead 145 from 146 removing power from cup drop motor coil 332 stopping the rotation of the cams in the position as shown. This again connects lead 140 to lead 145 preparing lead 140 for operation of the vending cycle as previously explained. When the cup drop motor has been energized by the closed circuit of the relay contacts of relays 350, 349, 348 or 347 as explained before, the ingredient cam 328 rotates in a clockwise direction and switch arm 360 drops into the cutaway section of the ingredient cam 328 connecting lead 154 of arm 360 to lead 155 the normally opened contact of the cam switch 360 applying power to line 155 through ingredient switch 336 the circuit of which may be traced as follows: Connecting lead 154 to lead 155 connects the common lead of lead 154, 144, 143, 105 and 104 to the ingredient motor circuit through lead 155 through pin 7 of the 12 pin male plug of the cup turret switch assembly 326 to lead 156 to pin 11 of the 12 pin male Jones plug of the relay box 344 to lead 157 to the coil of cam switch pulse relay 345 through the coil 345 to lead 103 to pin 1 of the 12 pin female Jones socket of the relay box 344 to line lead 102 to line 101 to line plug 352 energizing the cam switch pulse relay 345 when the switch contacts of cam switch 360 are closed at the instant the cam switch arm drops into the cut-away section of cam 328. When the cup drop motor 332 has been energized by the closed circuit of the relay contacts of relays 350, 349, 348 or 347 as explained before the gate cam 329 rotates in a clockwise direction and switch arm 361 drops into the cut-away section of cam 329 closing the cam switch contacts connecting lead 158 to 159. Lead 158 is connected to lead 144 as explained before to one side of the line 105 and 104. Lead 159 connects through pin 9 of the male Jones plug of the cup turret switch assembly 326 to lead 160 to pin 5 of the ingredient dispenser assembly 325 to lead 161 through the coil of the steam gate solenoid 354 to lead 240 to lead 173 to pin 7 of the 8 pin Jones plug of the ingredient dispenser assembly 325 to lead 174 to pin 5 of the female Jones socket of the relay box 344 to lead 175 through closed contacts of coin relay 351 to lead 236 to lead 103 through pin 1 of the female Jones socket of the relay box 344 to lead 102 to the bulldog box to lead 101 to the line plug 352, thus energizing steam gate 354 when the gate cam 329 rotates and closes the contacts of gate switch 361.

When the cup drop motor 332 has been energized by the closed circuit of the relay contacts of relays 350, 349, 348 or 347 as explained before, the water cam 330 rotates in a clockwise direction and switch arm 362 drops into the cut-away section of the water cam 330 connecting lead 162 of arm 362 to lead 139 the normally opened contact of the cam switch 362 applying power to line 139 through the water switch 337 the circuit of which may be traced as follows: Connecting lead 162 to lead 139 connects the common lead of lead 162 to lead 144, 143, 105 and 104 to the water solenoid circuit through lead 139 through water switch 337 to lead 139 to pin 11 of the male Jones plug of the cup turret switch assembly 326 to lead 138 to lead 241 through the hot water solenoid 308 to power line 102 through the bulldog switch box to the opposite side of the line 101 to the line plug 352 energizing the hot water solenoid 308 during the time that the water cam switch 362 arm has dropped into the cutaway section of water cam 330 dispensing water to the ingredient funnel for a length of time depending upon the length of the cutaway section of the water cam 330.

When the cup drop motor 332 has been energized by the closed circuit of the relay contacts of relays 350, 349, 348 or 347 as previously explained, the double sugar cam 331 rotates in a clockwise direction and the switch arm 363 drops into the cutaway section of the double sugar cam 331 connecting lead 163 to lead 164 connecting 163 of arm 363 to lead 164 the normally opened contact of the cam switch 363 applying power to line 164 through the now closed contacts of switch 363 the circuit of which may be traced as follows: Connecting lead 163 to lead 164 connects the common lead of lead 163, 144, 143, 105 and 104 to the double sugar motor circuit through lead 164 through pin 12 of the Jones plug of the cup turret switch assembly 326 to lead 165 through pin 3 of the male plug of the relay box 344 to lead 166 to the normally opened contact of the double sugar relay 347 to the rotor arm of lead 185 to lead 185 through pin 4 of the male Jones plug of the relay box 344 to lead 184 to pin 2 of the 8 pin Jones plug of the ingredient dispenser assembly 325 to lead 183 to the sugar motor 322 through its coil motor to lead 173 through pin 7 of the 8 pin Jones plug to lead 174 through pin 5 of the female Jones socket to lead 175 to the normally opened contact of lead 175 of the energized coin switch 351 through the rotor contact 236 through lead 236 to lead 103 to lead 102 through the bulldog box to lead 101 to the opposite side of the line of plug 352. This energizes the sugar motor of the ingredient dispenser assembly 325 for a period of time equivalent to and depending upon the length of the cutout section of the double sugar cam 331. The indexing switch 355 of the sugar motor 322 normally allows this motor to rotate 90° since the arm 355 connects lead 187 to lead 183 energizing motor 322 until arm 355 drops in the slot of the cut-out section of the sugar cam 323 breaking the holding circuit of the motor 322. This illustrates how the vending motor 322 rotates only 90° during each vend cycle of operation; however, since in the double sugar cam 331 the cut-away section is twice as long as that in the ingredient cam 328 which normally operates the sugar motor 322 cam 323 rotates twice or 180° giving a double amount of sugar when the circuit is connected to the double sugar cam 331 instead of the ingredient cam 328. The indexing circuit may be explained as follows: When sugar motor 332 is energized as explained above, sugar cam 323 rotates in a clockwise direction lifting indexing switch arm 355 and closing the circuit of the normally opened contact of lead 187 applying power to the motor 322 until the rotating sugar cam 323 reaches the next cut-away section of the cam opening this switch. Connecting switch contact arm 355 and lead 187 to the normally opened contact of lead 183 connects lead 187 to lead 183 which as explained above energizes vending sugar motor 322. Similarly the cocoa motor when energized rotates the cocoa cam 321 in a clockwise direction closing the contacts of the cocoa indexing switch 356 connecting contact arm 356 to its normally opened contact of lead 170 connecting lead 170 to lead 118 energizing the cocoa motor for a period of time equivalent to 180° of rotation when the arm 356 drops into the cutaway section 180° away on the cocoa cam 321 opening the contacts of the indexing switch removing power from the cocoa motor 320 and stopping it. These motors are clutch type motors and do not coast when the power is removed. Similarly the cream motor 318 when energized rotates the cream cam 319 in a clockwise direction closing the contacts of the cream indexing switch 358 connecting contact arm 358 to its normally opened contact of lead 118 connecting lead 118 to lead 179 energizing the cream motor 318 for a period of time equivalent to 90° of rotation when the arm 358 drops into the cutaway section 90° away on the cream cam 319 opening the contacts of the indexing switch removing power from the cream motor 318 and stopping it. Similarly the coffee motor 316 when energized rotates the coffee cam 317 in a clockwise direction closing the contacts of the coffee indexing switch 357 connecting contact arm 357 to its normally opened contact lead 188 connecting lead 188 to lead 118 to lead 176 energizing the coffee motor 316 for a period of time equivalent to 90° of rotation when the arm 357 drops into the cutaway section 90° away on the coffee cam 317 opening the contacts of the indexing switch removing power from the coffee motor 316 and stopping it. When the coin switch 351 is energized and held energized by its contacts of leads 142 and 235 the selector switches are in a position to select the proper ingredients. The selector switches 310, 311, 312, 313, 314 and 315 are placed in the electrical circuit in such a position to energize relays 350, 349, 348, 347, 346 and 345 which in turn complete a vending cycle delivering a cup to the cup station and applying the proper amount of ingredients and hot water to the cup. The circuit of selector switch 310 has previously been explained. Pressing coffee cream selector switch 311 energizes coffee relay 350 and cream relay 349, the circuit of which may be traced as follows: Selector switch 311 is a double pole single throw micro switch with two sets of normally opened contacts connected to lead 202 and lead 204 and the common rotor arm connected to lead 134. Lead 134 is connected to lead 132 the common lead to all the selector switches which connects to lead 102 through the bulldog box to lead 101 to one side of the line of line plug 352. Connecting lead 202 to lead 134 connects line 134 through lead 202 to pin 7 of the male Jones plug on relay box 344 to lead 203 to lead 197 through the coil of cream relay 349 to lead 228 to the relay coil common lead 214 to the now closed contacts of lead 214 of coin relay 351 through the rotor arm connected to lead 127 to pin 8 of the female Jones socket of relay box 344 to lead 126 to pin 7 of the coin changer. Pin 7 of the coin changer is an anti jackpot lead which connects through the normally closed contacts of the coin switch to lead 122 to pin 1 to lead 122 to lead 105 through the bulldog box to lead 104, the opposite side of the line plug 352. This circuit applies power to the coffee relay 350. Power is held on the coffee relay by a set of contacts which close connecting lead 205 to lead 233 keeping power on the relay coil through lead 205 to lead 206 until the coin relay 351 is deenergized by the cup turret set up cam 327 opening the common coil lead 232 to lead 214 as explained before. Closing this coffee relay energizes the cup vending motor through to closed contacts of lead 106 and 223 connecting these leads together applying power to the cup drop motor 332 as previously explained. Energizing the cream relay 349 closes all normally opened contacts and connects lead 209 to lead 181 and lead 230 to lead 231 connecting lead 230 to lead 231 applies power to the cup drop motor 332 through the parallel circuit as explained hereinabove in the explanation of the operation of the cup drop motor 332. Closing the contacts of lead 181 and 209 connects lead 181 to lead 209 to lead 207 the normally opened contacts on the cam switch pulse relay 345 preparing this circuit for operation when the ingredient cam switch 328 rotates connecting lead 154 to lead 155 energizing the cam switch pulse relay 345 as explained before. Connecting lead 181 to lead 209 through the closed contacts of cream relay 349 connects lead 209 to lead 181 through pin 2 of the male Jones plug of the relay box 344 to 180 to pin 3 of the Jones plug of the ingredient dispenser assembly 325 to lead 179 to cream motor 318. When cam switch pulse relay 345 is energized lead 209 becomes connected through the closed contacts to lead 106 to pin 10 of the female Jones socket of the relay box 344 to lead 105 through the bulldog box to lead 104 to one side of the line of the line plug 352 applying power to the cream motor 318 energizing it until indexing cam switch 358 takes over and keeps the motor energized until the arm 358 drops into the cutaway section of the cam 319 removing the power from the arm 358 thus indexing it 90° as explained before. As explained above closing contacts of push button switch 311 energizes the coffee relay and the cream relay setting up the circuit so that both coffee and cream ingredients are now dispensing into the mixing bowl the water solenoid 308 is opened by the water cam 330 for a period of time sufficient to permit the discharge of 5 oz. of water. Closing selector switch 312 connects lead 193 and lead 199 to the common rotor 135 to lead 132 the common of the switches to lead 102 through the bulldog box to lead 101 to one side of the line plug 352. As explained before, connecting lead 204 to lead 135 energizes the coffee relay 350. Connecting lead 135 to lead 193 through pin 8 of the male Jones plug of the relay box 344 to lead 194 to line 196 through the coil of sugar relay 348 to line 224 to line 214 energizes the sugar relay 348. This relay is held on by its holding contacts which connect line 225 to lead 195 to lead 103 through pin 1 of the female Jones socket of relay box 344 to lead 102 to the bulldog box to lead 101 to plug 352 of the line plug, energizing the coil until the circuit is broken as explained before. Energizing the sugar relay 348 connects lead 226 to lead 227 which is in parallel with lead 106 and 223 of the coffee relay 350 thus energizing the cup drop motor 332 as explained before. Closing the contacts of lead 210 and 219 connects lead 219 to lead 210 to the normally opened contact of lead 210 of cam switch pulse relay 345. Lead 219 connects to the normally closed contact of lead 219 of double sugar relay 347 through the rotor arm to lead 185 to pin 4 of the male Jones plug of the relay box 344 to lead 184 to pin 2 of the Jones plug of the ingredient dispenser assembly 325 to lead 183 to one side of the sugar motor coil 322 through the coil to lead 183 to lead 173 to pin 7 of the ingredient dispenser assembly 325 to lead 174 through pin 5 of the female Jones socket of the relay box 344 to lead 175 to the now closed contact of lead 175 on coin relay 351 to common lead 226 to lead 103. Connecting lead 210 to lead 219 in the above mentioned circuit conditions lead 210 to be energized by the closed contacts of the cam switch pulse relay 345 when this relay closes connecting lead 210 to lead 211 to lead 106 through pin 10 of the female Jones socket of relay box 344 to lead 105 through the bulldog box to lead 104 to the opposite side of the line of line plug 352 energizing the sugar motor 322 which is indexed 90° by its cam 323 and cam switch 355 as explained in circuits for coffee and cream. This circuit shows how closing the contacts of the coffee sugar switch 312 energizes coffee relay 350 and sugar relay 348 energizing coffee dispensing motor 316 and sugar dispensing motor 322 dispensing measured amount of coffee and sugar to the mixing bowl with a 5 oz. amount of hot water dispensed through solenoid 308 when the hot water cam switch 362 drops into the cut-away section of the water cam 330 during the rotation of the shaft of the cup drop motor 332. Closing selector switches 313, 314 and 315 connect leads 198 of the coffee cream switch 313 to lead 136 to lead 132 to lead 102 through the bulldog box to lead 101 to one side of the line plug 352. Lead 198 is connected to lead 202 and so the same relay 349 the cream relay, is energized via the same lead 202 to lead 198 through the switch to lead 136 as lead 202 to lead 134 to lead 132 of switch 311 as explained before. Lead 192 is connected to lead 202 to relay coil 349 through the switch contacts of switch 314 to lead 137 to lead 132. Lead 202 is connected to lead 189 through the closed contacts of the chocolate switch 315 to lead 132 connecting lead 132 to lead 202 to the coil of cream relay 349 energizing the relay coil. As shown above any of these following switches are depressed closing their circuits coffee cream switch 311, coffee cream sugar switch 313 coffee cream double sugar switch 314 and hot chocolate switch 315 closing the coffee cream switch 311 also connects lead 200 to lead 193 of switch 313 and connects lead 200 to lead 136 to lead 132 to lead 102 through the bulldog box to 101 to one side of the line plug 352. Lead 200 of switch 313 is also connected to lead 193 of the coffee sugar switch 312 connecting lead 200 through the closed contacts of the coffee cream switch 313 to lead 136 energizing the sugar relay 348 in a similar manner as the circuit of lead 193 and 135 of coffee sugar switch 312. Closing coffee cream sugar switch 314 connects lead 190 through the closed contacts to lead 137 to lead 132 to lead 102 through the bulldog box to lead 101 to one side of the line plug 352 applying power to lead 190. Lead 190 connects through pin 9 of the male Jones plug of the relay box 344 to lead 191 through the coil 347 of the double sugar relay 347 to the common line 216 energizing the coil of the double sugar relay 347. Lead 191 also connects to lead 220 through the now closed contacts of the double sugar relay 347 to lead 221 to lead 103 keeping the double sugar relay energized as explained before until one complete cycle or revolution of the cup drop motor 332 and set up motor 327 has been made. Energizing double sugar relay 347 connects lead 222 to lead 223 which is the parallel circuit with lead 226 and 227 of the sugar relay 348 and lead 230 and 231 of the cream relay 349 and lead 106 and 223 of the coffee relay 350 which applies power to the cup drop motor 332 as explained before. Since the cream relay 349 has been energized by switch 314 lead 230 has been connected to lead 231 and power has been applied to the cup drop motor 332. Double sugar relay 347 contains a set of single pole double throw set of contacts the rotor arm connected to lead 185, the normally opened contact to lead 166 and the normally closed contact to lead 219. When this relay 347 has been energized lead 185 is disconnected from lead 219 and connected to lead 166. Lead 185 connects through pin 4 of the male Jones plug of relay box 344 to lead 184 to pin 2 of the Jones plug of ingredient assembly 325 to lead 183 to the sugar motor 322. Connecting lead 185 to lead 166 connects the sugar ingredient motor 322 as explained above to lead 166 to pin 3 of the male plug of relay box 344 to lead 165 through pin 12 of the male Jones plug of the cup turret assembly 326 to lead 164 to the normally opened contact of double sugar cam switch 363. When cam switch 331 rotates in a clockwise direction and arm 363 drops into the cutaway section of the double cam 331 lead 164 is connected to lead 163 applying power to the sugar motor 322. Since this cam is cutaway in larger proportion and in proper proportion sugar cam 323 rotates twice and indexes 180° rather than 90° giving double sugar rather than single sugar during the vend cycle as explained before. Depressing or closing the contacts of the hot chocolate selector switch 315 as explained before, connects lead 189 to lead 132 to lead 102 through the bulldog box to lead 101 to the line plug 352 energizing through lead 189 and 102 and 203 the cream relay 349 energizing cream relay 349 connects lead 230 to lead 231 energizing the cup drop motor as explained before. Connecting lead 187 to lead 132 of the chocolate switch 315 connects lead 132 to lead 187 to pin 10 of the male Jones plug of the relay box 344 to lead 188 through the coil of chocolate relay 346 energizing the coil which is held on by its contacts which are connected to lead 214 and lead 216 keeping the coil of chocolate relay energized until the coil relay 351 is deenergized by the set up cam 327 as explained before. The chocolate relay 346 contains a single pole double throw set of contacts the rotor arm being connected to lead 212 the normally closed contact to lead 178 and the normally opened contact to lead 172. The common contact lead 212 is connected to the normally opened contact on the cam switch pulse relay 345. Energizing chocolate relay 346 disconnects common lead 212 from the normally closed contact 178 and the contacts common lead 212 to lead 172. Lead 178 the normally closed contact, as explained before, was connected through pin 5 of the relay box 344 to lead 177 to pin 1 of the Jones plug of the ingredient dispenser assembly 325 to lead 176 to the coffee motor 316. This means that whenever the chocolate relay is not energized power will be applied to the coffee motor 316 through leads 178 and 212 to the cam switch pulse relay contacts of cam switch 345. However, when this chocolate relay is energized the pulsing lead of the common contact 212 is disconnected from the normally closed contact 178 of the chocolate relay 346 and connected to the normally opened contact 172 of the chocolate relay 346. Closing the contacts, as explained above, connects lead 172 through pin 12 of the Jones plug of relay box 344 to lead 171 to pin 4 of the Jones plug of ingredient dispenser assembly 325 to lead 170 to the hot chocolate motor 320 energizing the hot chocolate motor 320 instead of the coffee motor 317 when chocolate relay 346 has been energized. Thus, depressing the chocolate switch 315 as explained above, dispenses hot chocolate cream and sugar by energizing chocolate motor 320 cream motor 318 and sugar motor 322. When the coil 346 of the chocolate relay is energized lead 195 is connected to lead 217 connecting lead 195 to lead 217 which is connected to lead 103 the common power lead of the relay coils lead 103 is connected to lead 195 to lead 196 to the sugar relay 348 energizing the sugar relay and dispensing sugar as explained before in the circuitry of the sugar relay. Service outlet 340 is across the line at all times and is connected to power by means of lead 104 and lead 101 to the line plug 352. Suction fan 300 is connected across line 102 and line 105 the circuit of which may be traced as follows: One lead of the fan motor 300 lead 108 is connected to lead 102 to the bulldog circuit breaker 339 to lead 101 to one side of the line plug 352. The other lead of the fan motor 300 is connected by lead 107 to lead 105 to the bulldog circuit breaker to the opposite side of the line plug 352. When the bulldog circuit breaker is in the "on" position the fan motor continues to operate in the circuit explained above. Slop can switch 301 serves a dual purpose. With the switch in the position shown, one side of the line 105 is connected through switch arm lead 109 to lead 130 to lead 110 through switch 110 to boiler heater 302 through thermostat 303 to lead 112 to lead 102 through the circuit breaker to lead 101 to line plug 352. This energizes the boiler heater 302 when the slop can switch is in the position mentioned. With the slop can switch in this position it also connects line 109 to line 130 to line 111 through the coil of the cold water solenoid 304 to lead 112 to lead 102 through the bulldog switch to the opposite side of the line plug 352 energizing the cold water solenoid and the slop can switch as long as it remains in this position. With the slop can switch in the position mentioned it also connects lead 109 to lead 130 to pin 1 of the cup turret switch assembly to lead 131 to the rotor arm of the cup empty switch 338 through normally opened contacts to lead 129 to pin 3 of the Jones plug of the cup turret assembly 326 to lead 128 to pin 6 of the coin changer 309. Pin 6 of the coin changer 309 connects in the coin changer of known design to the coin acceptance coils which must be energized by power on this lead 128 in order for the coin rejector to accept coins. When the slop can switch 301 opens, this connects lead 130 from lead 309 all electrical devices connected to lead 130 are placed in the open circuit or non-operating position, thus the boiler heater is disconnected, the cold water solenoid is disconnected and the coin acceptance coil of the slug rejector is disconnected through pin 6 of the coin changer plug. This slop can switch 301 is opened when the float in the slop can presses upward against the micro switch arm opening the switch and disconnecting the leads mentioned above. The wrap on after heater 305 is connected across the line 105 and 102 by means of the following circuit: Lead 105 connects to lead 113 through the wrap-on heater 305 to lead 114 to lead 102 the opposite side of the line applying power to the after heater as long as the bulldog circuit breaker is in the on position. Fluorescent lights 307 are energized and illuminated by means of the following circuit: Lead 105 one side of the line is connected to lead 115 through ballast transformer 306 through the fluorescent lamps and starter assembly 307 through lead 116 back to the opposite side of the line 102. This circuit energizes the fluorescent lamps and illuminates it when hte bulldog box is placed in the "on" position. Lead 353 of the line plug 352 is a third wire ground connection which should be made to a good ground and is connected through the cable to lead 100 and grounded to the chassis of the bulldog box 339 as shown. Sold out light 342 is energized when there are no more cups in the cup dispensing turret the circuit of which may be explained as follows: One side of the line lead 102 is connected to lead 152 of the sold out lamp 342 through the sold out lamp to lead 153 through pin 4 of the Jones plug of the cup turret switch assembly to lead 152 to the normally opened contact of the cup empty switch 338. When the cups are empty this switch connects lead 152 to lead 131 to pin 1 of the Jones plug of the cup turret assembly 326 to lead 130 to the slop can empty switch 301 through the contacts of the slop can empty switch 301 to lead 109 to lead 105 the opposite side of the line, thus illuminating sold out lamp 342 when the normally opened contact of the cup empty switch 338 becomes closed. Nickel only lamp 343 is illuminated when the nickel storing switch in a standard changer of known design is opened due to there being no coins remaining in the nickel storage chute of the coin changer the circuit of which may be traced as follows: Lead 105 one side of the line is connected to lead 150 through the nickel only lamp 343 to lead 125 to pin 5 of the coin changer. Pin 5 of this coin changer is connected through normally opened switch to pin 2 to lead 132 to lead 102 the opposite side of the line, thus energizing the nickel only switch when nickels are out of the coin changer 34.

What I claim as new is:

1. A hot beverage concocting and dispensing device comprising a support member, a plurality of cylindrical containers for powdered ingredients mounted on said support member, means securing said cylindrical containers to said support member, said support member having a plurality of openings, a closure member mounted at the lower end of each of said containers, each of said closure members having a discharge outlet in communication with each of said openings, a shaft extending along substantially the axis of each of said cylindrical containers and being rotatably mounted on said closure members, a measuring disk secured to said shaft in each of said containers adjacent said closure members for dispensing a measured quantity of ingredient through said discharge outlets, a baffle plate mounted in each of said containers above said measuring disk, a plurality of agitator members mounted on each of said shafts, a discharge duct mounted below said support member communicating with said openings, a second closure member mounted on said discharge duct, means pivotally mounting said second closure member, means pivoting said second closure member away from said discharge duct and further means operatively connected to said shafts for selectively rotating said measuring disks and discharging a measured quantity of desired ingredient through said discharge duct while said closure member is pivoted away from said discharge duct.

2. The structure as recited by claim 1 and an ingredient funnel mounted in spaced relation to said discharge duct, a nozzle mounted in said ingredient funnel, hot water pipe means connected to said nozzle, a fan mounted adjacent said ingredient funnel, electrical means energizing said fan, said fan directing a stream of air transversely of said discharge duct and said ingredient funnel and preventing the ingress of steam into said containers of powdered ingredients, and pipe means connected to said ingredient funnel for dispensing the concocted beverage.

3. A hot beverage concocting and dispensing device comprising a cylindrical container for an ingredient, a closure member mounted at the lower end of said container, said closure member having a discharge outlet, a shaft extending along substantially the axis of said cylindrical container and being rotatably mounted on said closure member, a measuring disk secured to said shaft in said container adjacent said closure member for dispensing a measured quantity of ingredient through said discharge outlet, a baffle plate mounted in said container above said measuring disk a plurality of agitator members mounted on said shaft, a discharge duct communicating with said discharge outlet, a second closure member mounted on said discharge duct, means pivotally mounting said second closure member, means pivoting said second closure member away from said discharge duct and further means operatively connected to said shaft for rotating said measuring disk and discharging a measured quantity of ingredient through said discharge duct.

4. A hot beverage concocting and dispensing device comprising a cylindrical container for an ingredient, a closure member mounted at the lower end of said container, said closure member having a discharge outlet, a shaft extending along substantially the axis of said cylindrical container and being rotatably mounted on said closure member, a measuring disk secured to said shaft in said container adjacent said closure member for dispensing a measured quantity of ingredient through said discharge outlet, a baffle plate mounted in said container above said measuring disk a plurality of agitator members mounted on said shaft, a discharge duct communicating with said discharge outlet, a second closure member mounted on said discharge duct, means pivotally mounting said second closure member, means pivoting said second closure member away from said discharge duct, further means operatively connected to said shaft for rotating said measuring disk and discharging a measured quantity of ingredient through said discharge duct, an ingredient funnel mounted in spaced relation to said discharge duct, a nozzle mounted in said ingredient funnel for discharging hot water, a fan mounted adjacent said ingredient funnel, electrical means energizing said discharge duct and fan for discharging a stream of air transversely thereto and preventing the ingress of steam into said container of ingredient, and pipe means connected to said ingredient funnel for mixing and dispensing the mixture from said ingredient funnel.

References Cited in the file of this patent
UNITED STATES PATENTS

| Number | Name | Date |
|---|---|---|
| 922,085 | Chamberlain | May 18, 1909 |
| 1,673,155 | Neilsen | June 12, 1928 |
| 1,944,810 | Rogers | Jan. 23, 1934 |
| 2,569,486 | Mills | Oct. 2, 1951 |
| 2,601,943 | Torrese | July 1, 1952 |
| 2,614,738 | Mills | Oct. 21, 1952 |
| 2,626,785 | Lewis et al. | Jan. 27, 1953 |
| 2,712,887 | King | July 12, 1955 |
| 2,755,000 | Parre | July 17, 1956 |